Sept. 10, 1946. D. K. MORRISON 2,407,322
DIFFERENTIAL CONTROL DEVICE
Filed Jan. 19, 1945
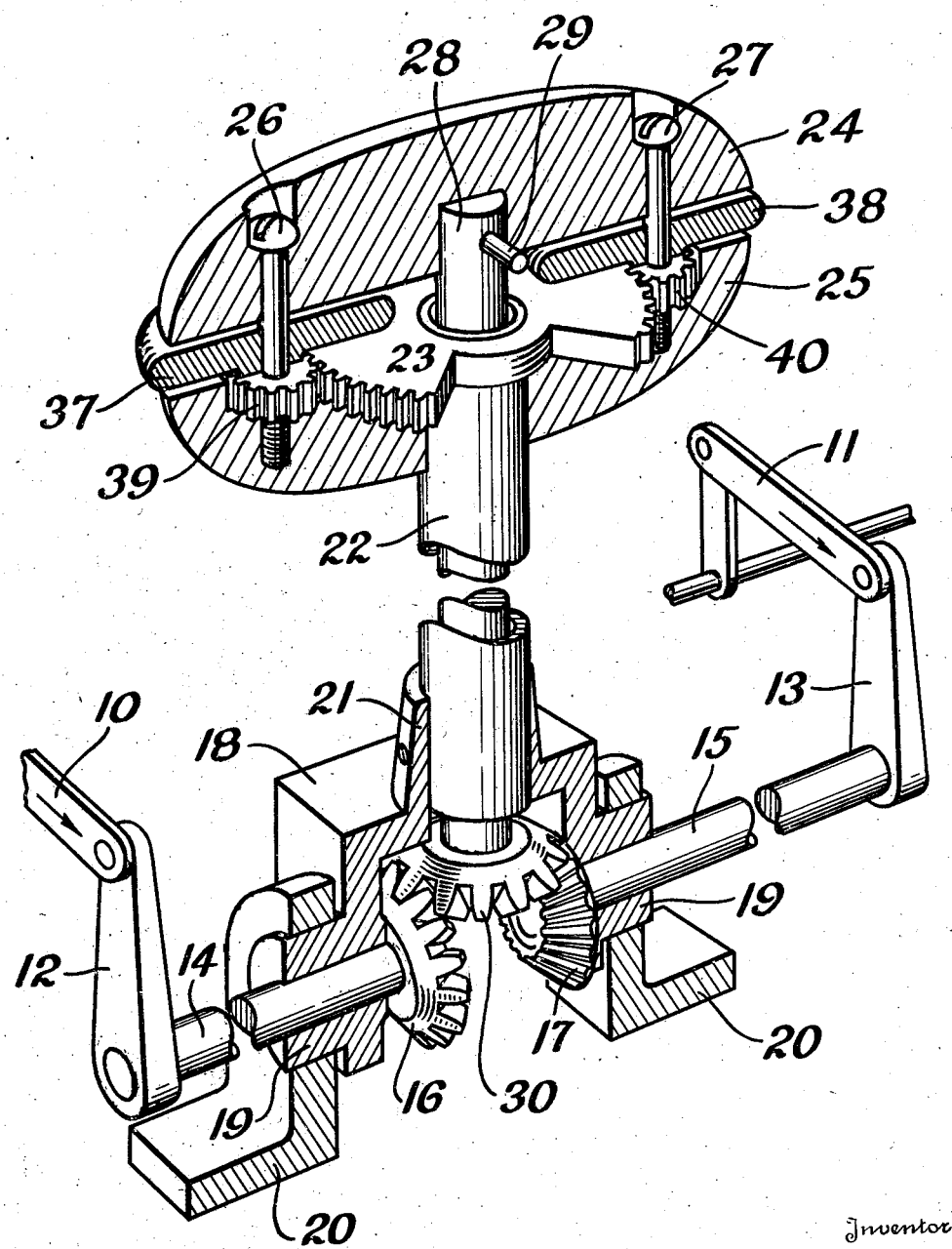
Inventor
DAVID K. MORRISON
By Ralph L. Chappell
Attorney Patented Sept. 10, 1946

2,407,322

UNITED STATES PATENT OFFICE 2,407,322

DIFFERENTIAL CONTROL DEVICE

David K. Morrison, Arlington, Va.

Application January 19, 1945, Serial No. 573,619

2 Claims. (Cl. 74—471)

(Granted under the act of March 3, 1883, as amended April 30, 1928; 370 O. G. 757)

The present invention relates to control devices. More specifically, it relates to a differential control lever designed to permit simultaneous adjustment of two or more related mechanisms, while permitting precise individual regulation of each. Thus the relative adjustments of a group of related mechanisms may be maintained in a given condition with respect to each other, while the absolute position of all of the units of the group are altered. Conversely, the individual adjustments of the separate units may be altered with respect to each other without changing the mean absolute setting.

Before describing the mechanical details of the form of the invention chosen to illustrate the principles of this invention, it may be explained that certain mechanical devices require a highly exact coordination of a number of separate control instrumentalities, not only to accomplish smooth operation, but, in many instances, to avoid danger of serious accidents.

A typical case might be the control of a pair of twin-engines of an aircraft, or of airplane wing flaps or wheel brakes. In such mechanisms any great variation in thrust or braking effect may easily cause the plane to swerve to one side or the other, with possible disastrous results. Ordinarily, the opposite pairs of these mechanisms are individually controlled by manual operating levers, with the result that it is extremely difficult if not impossible to accomplish even approximate equalization of control. As an example, consider the problems incident to gradually opening the throttles of a pair of aircraft motors from idling speed to full throttle and yet maintaining the motors in synchronism with each other throughout their entire range of speeds. With an ordinary type of controls, no exact coordination between the two motors can exist; since even though the pilot may attempt to move both throttle levers simultaneously, certain maladjustments will exist. These maladjustments will cause the speed and thrust of one motor to exceed that of the other, thus destroying perfect equilibrium of forces and tending to alter the true course of the craft. Equally great problems arise in the control of wing flaps or wheel brakes since any inequality of control will tend to swerve the plane from its true course.

It has been learned, however, that notwithstanding the necessity for coordination between a pair of controls such as those above mentioned, it is impractical to attempt to permanently connect the separate control instrumentalities (as by connecting both throttles of a twin-engine aircraft to a single manually controlled throttle lever). In the case of brakes, for example, it is necessary for the pilot to be able to control the wheels separately to aid in manipulation of the plane on the runway. Similarly, in the case of motor throttles, it is necessary to be able to exert differential control on the motors in order to aid in turning the craft or in order to compensate for irregularities of motor performance.

The foregoing comments are only intended to point out that the control here disclosed is regarded as capable of use in many and varied applications, and that the use of it in the exact form described is intended only as a typical example.

In the form of the invention illustrated in the drawing, each of a pair of separate control instrumentalities is directly connected to one of a set of differential gears. The gear box is provided with a hand lever so that the entire gear housing may be bodily shifted to move the two control instrumentalities equally and in exact synchronism. The hand lever, however, is provided with a rotatable knob to effect differential adjustment of the two controls in response to rotary movement of a hand grip on the lever. Vernier adjustment is accomplished by a pair of thumb controls, coupled to reducing gears to provide for accurate positioning of the rotatable hand grip.

Referring now more particularly to the drawing, the numerals 10 and 11 designate links by which the control mechanism can be connected to any two devices. Thus, these links may be taken as representative of separate control instrumentalities which must be properly coordinated. The links 10 and 11 are actuated by cranks 12 and 13 carried on the ends of the shafts 14 and 15, respectively. The adjacent ends of the shafts 14 and 15 carry the opposite gears 16 and 17 of a differential gear cluster. The shafts are journaled in the gear box or housing 18, which has a pair of hubs 19 concentric with the shafts 14 and 15. The hubs 19 are in turn journaled in suitable stationary mounts, such as the brackets 20 illustrated. The differential gear case 18 includes a center hub 21 in which a manually operable lever comprising a tube 22 is mounted. The tube 22 carries a double segmental gear 23 solidly fixed to its upper end. A rotatable hand grip is also mounted on the upper end of the tube.

The hand grip is formed of two separable halves 24 and 25 arranged to provide a smooth outer surface of generally oval shape. The lower half of the knob is freely rotatable on the upper end of the tube 22 and is secured to the upper half 24 of the knob by a pair of machine screws 26 and 27. The upper half 24 of the knob is connected to a shaft 28 by means of a crosspin 29. The shaft 28 extends downwardly through the tube 22 and has an idler gear 30 secured to its lower end. The idler gear 30 meshes with the level gears 16 and 17, and since the shaft 28 is freely rotatable within the tube 22 the rotation of the shaft will effect differential adjustments of the control links 10 and 11.

The hand knob 24—25 includes a pair of vernier wheels 37 and 38 mounted on the screws 26 and 27, respectively, and arranged for rotation between the upper and lower portions of the knob. Each of these wheels 37 and 38 includes a knurled edge, a portion of which projects beyond the general contour of the knob, so that the wheel may be manipulated by the thumb of a person gripping the knob. The wheels 37 and 38 each carry one of the small spur gears 39 and 40. Thus the wheels are arranged to be rotated with the thumb, and the spur gears arranged to mesh with the opposite segments of the double segmental gear 23.

In describing the operation, it may be assumed that the position of the various parts of the mechanism shown in the drawing is the position they assume as a base reference. Then, if the mechanism is assumed to control the throttles on a pair of twin aircraft engines, the position shown would be the position in which both of the throttles are completely closed, and the throttle of each engine will be opened by the movement of the links 10 and 11 in the direction indicated by the arrows. Operation of both throttles may thus be accomplished by simply grasping the control knob 24—25 and drawing it rearwardly, so that the gear box 18 will rotate with respect to the brackets 20. As this is done the knob 24—25 is maintained in stationary position with respect to the tube 22. Thus the movement of the control in one degree of freedom will result in the equal and synchronized operation of both of the control instrumentalities. However, the hand knob 24—25 is also capable of movement in another degree of freedom; that is, rotation of the knob with respect to the tube 22. When the knob is rotated, the motion will be transmitted to the idler gear 30 by the shaft 28 and the differential gear cluster will function to open one throttle slightly and close the other a corresponding amount. Obviously, the relative direction of rotation of the knob will determine which throttle will be moved toward the open condition and which will be closed. Thus, if when the lever 22 is drawn straight back and the throttles are equally open, some other factor should cause an inequality in the speed or power output of the twin motors, the power can be instantly equalized and the speed synchronized by slightly rotating the hand knob to the right or left as required. This rotation of the knob may be accomplished by simply twisting it with the hand, but a more exact control is accomplished by rotating one of the vernier wheels 37 and 38 with the thumb, so that the small gears 37 and 38 will act on the segmental gear 23 to give a fine adjustment of the position of the hand grip with respect to the tube.

It is obvious, of course, that this result may be accomplished by the use of only one vernier wheel, but the structure illustrated includes a wheel at each end of the hand knob so that a wheel is in a position for manipulation by the thumb of either the left or right hand. This is particularly desirable in a control designed to the mount between the pilot and copilot on a dual control aircraft, since it may be manipulated by the right hand of the pilot or the left hand of the copilot.

It is believed that from the foregoing description, it will be apparent that the present invention provides a control handle wherein movement of the control in one degree of freedom adjusts the total amount of displacement of a pair of control instrumentalities with respect to a base reference position and so that movement in a second degree of freedom adjusts the displacement of these elements with respect to each other, and differentially with respect to the base reference position.

It has been hereinbefore pointed out that the present disclosure contemplated numerous differential applications of this inventive thought and is intended as a typical illustration rather than as a limitation of the scope of the invention. It is accordingly requested that the scope of patent protection based on this disclosure be regarded as limited solely by the terms of the appended claims.

The invention, if patented, may be used by or for the Government of the United States without the payment to me of any royalty thereon.

Having thus described the invention, what it is desired to protect by United States Letters Patent is:

1. In a manually operable control mechanism for a pair of control instrumentalities, the combination, with a differential gear cluster interconnecting the control instrumentalities and a shiftable gear case housing said differential gears, of a manually operable hand lever including a hollow tube fixed to the gear case and having a double segmental gear rigidly secured to the tube and remote from the gear case; a rotatable shaft secured to one of the gears of the differential gear cluster and extending through the tube; a hand grip comprising an upper portion fixed to the shaft and adapted to rotate therewith, and a lower portion rotatably mounted on the aforementioned tube at a point between the segmental gear and the gear case, so that the gear lies between the two separable halves of the hand grip; together with a pair of screws to secure the two portions of the hand grip together; a pair of pinions rotatably mounted on the screws and meshing with the opposite sides of the double segmental gear, and a thumb wheel fixed to each of the pinions, so that the thumb wheels lie between the halves of the hand grip and extend outwardly beyond the surface of the grip to provide a thumb operated vernier adjustment on each side of the hand grip.

2. In a manually operable control mechanism for a pair of control instrumentalities, the combination, with a differential gear cluster interconnecting the control instrumentalities and a shiftable gear case housing said differential gears, of a manually operable hand lever including a hollow tube fixed to the gear case and having a gear rigidly secured to the tube and remote from the gear case; a rotatable shaft secured to one of the gears of the differential gear cluster and extending through the tube; a hand grip comprising an upper portion fixed to the shaft and adapted to rotate therewith and a lower portion rotatably mounted on the aforementioned tube at a point between the gear and the gear case; together with means to secure the two portions of the hand grip together; at least one pinion rotatably mounted within the hand grip and meshing with the gear, and a thumb wheel fixed to the pinion and extending outwardly beyond the surface of the grip portion to provide a thumb operated vernier adjustment.

DAVID K. MORRISON.